United States Patent Office 2,760,692
Patented Aug. 28, 1956

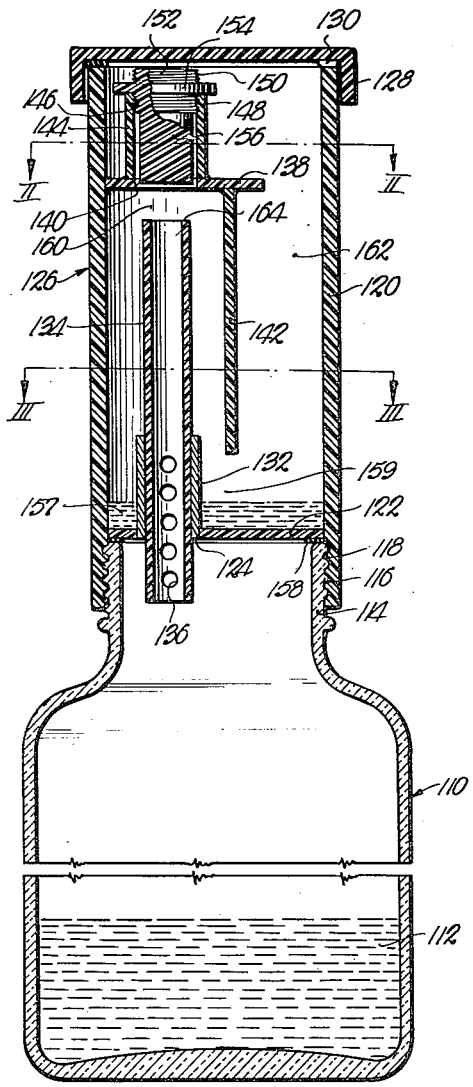

2,760,692

LIQUID MEASURING AND DISPENSING DEVICE

William W. Buehlig, Kansas City, Mo.

Application June 27, 1955, Serial No. 518,142

5 Claims. (Cl. 222—434)

This invention relates to the field of liquid dispensing attachments adapted for use with liquid containers and, more particularly, to an improved, simplified device for accurately measuring and dispensing predetermined quantities of liquid or, alternatively, for dispensing such liquid in even but uninterrupted bulk flow when continuous delivery is desired.

It is known that a number of prior attempts have been made to present apparatus adapted for accomplishing the same general purposes as contemplated and attained by the present invention. Certain of the prior devices have been limited to use in only particular dispensing applications, for instance, in connection with liquors where a relatively large quantity is to be dispensed and delivered without any particular need for extreme accuracy, and other prior devices have similarly been subject to various disadvantages. So far as is known, however, all of such prior devices have been subject to either the objection of being relatively inaccurate or the objection that they involve such complex and expensive structural configurations as to render the same impractical.

Accordingly, it is the primary object of this invention to overcome such disadvantages of prior apparatuses by providing a liquid measuring and dispensing device which is both extremely accurate in measurement and exceedingly simple, and therefore inexpensive, in construction.

It is another important object of this invention to provide such a measuring and dispensing device whose utility will not be limited to application in connection with a particular type of material. In fact, the present invention is especially intended for use in connection with liquid medicines, liquid detergents and similar materials where relatively small quantities are to be dispensed with great accuracy of measurement. Obviously, however, the device of the present invention is adapted for use in the measuring and dispensing of practically any liquid, and such use is contemplated as within the scope of the invention.

It is another important object of the invention to provide improved means for adjusting the predetermined quantity of liquid which will be measured and dispensed by the device during each operation thereof.

It is another important object of the invention to provide means for permitting direct and continuous delivery of liquid without measurement by structure which also cooperates with and enhances the versatility and operation of the device when the latter is being used for measured quantity dispensing.

Still other important objects of the invention will be made clear or become apparent as the following specification progresses. In the accompanying drawings:

Figure 1 is a central cross-sectional view of a liquid container showing one of the measuring and dispensing devices contemplated by this invention in place thereon, the particular embodiment of device illustrated in Fig. 1 including several important structural improvements over the more basic embodiment illustrated in Fig. 4;

Fig. 2 is a cross-sectional view taken on line II—II of Fig. 1;

Fig. 3 is a cross-sectional view taken on line III—III of Fig. 1; and

Fig. 4 is a fragmentary view, partially in elevation and partially in cross-section, of a modified, more basic embodiment of the present invention, showing the container and device in inverted condition, as they would be during the actual dispensing operation.

Referring first to the basic embodiment of the invention illustrated in Fig. 4, which is adapted and intended for use in the dispensing of liquids in either a continuous flow or in discreet measured quantities of one predetermined and fixed magnitude, the numeral 10 generally designates a liquid container while the numeral 12 generally designates the basic form of device contemplated by the invention.

The container 10 may be of any conventional configuration, that chosen for illustration being a glass bottle having a neck portion 14 provided with external threads 16 adjacent the open mouth of neck 14.

The device 12 includes an elongated, tubular element 18, which is preferably cylindrical as illustrated, but could conceivably be of other transverse, cross-sectional configuration providing that proper provision for attachment of the element 18 to the neck 14 of bottle 10 was made. For purposes of illustration, the element 18 is shown as threaded upon the thread 16 of bottle 10 adjacent one end of the element 18, it being understood that the latter is provided with complementary internal threads for receiving the thread 16. For use with bottles 10 not having threads 16, any other suitable means of attaching the device 12 with one extremity of the element 18 in communication with the mouth of the bottle 10 could be used, for instance, a pressed or frictional engaging seal or the like.

A circular disc 20 is rigidly mounted within the element 18 transversely of the latter adjacent the end of the element mounted upon the bottle 10. The disc 20 is provided with a circular opening 22 therethrough in which is mounted one end of an elongated tubular member 24, which extends from disc 20 in a direction away from the bottle 10. The member 24 is open at both ends and one end thereof communicates with the interior of bottle 10 through the opening 22. An annular gasket 26 is preferably provided between the disc 20 and the end of neck 14 of bottle 10 defining the open mouth thereof, so that when the element 18 is tightly screwed upon the thread 16, the gasket 26 will effect a seal between the neck 14 of bottle 10 and the disc 20.

A top plate 28 covers a major segment of the end of element 18 remote from bottle 10, including the portion of said end of the element 18 in alignment with the extended axis of member 24. Plate 28 is provided with a threaded perforation 30 therein, and a threaded plug 32 is adapted to screw within perforation 30 to close the same.

A vertical partition extending transversely across the interior of a portion of the length of element 18 is mounted on the inner side of plate 28 and extends from the latter in the direction of disc 20 defining a measuring chamber 36 surrounded on all except its normally bottom side by the element 18, the partition 34 and the plate 28, a storage space 38 surrounded on all except its normally uppermost side by the element 18 and the disc 20, and a delivery passage 40 between element 18 and partition 34 which is open to the atmosphere as at 42 between element 18 and plate 28 and open to the storage chamber 38 at the normally lowermost extremity of the passage 40, the storage chamber 38 serving to place the measuring chamber 36 and the delivery passage 40 in communication between the normally lowermost extremity 44 of partition 34 and the disc 20.

It may be observed that the various parts of device 12 just described may be made of any suitable material adapted for liquid tight sealing between the various interengaging portions thereof. Thus, metal, glass or the like could conceivably be used, although the preferred construction utilizes plastic material. Moreover, it will be understood by those skilled in the art that, although the various interconnected parts of device 12 may be separately formed and then joined together by any suitable cement or bonding process known to the plastics art, the simple construction of device 12 also adapts it for the integral formation of various combinations or all of the interconnected parts described by processes known to the plastic manufacturing art.

It will be understood from the explanation of operation to follow that the critical considerations determining the magnitude of the quantity of liquid to be measured by the device during each operation are the length of the member 24 and, more particularly, the spacing of the normally uppermost end thereof from the plate 28 and the relative positioning of the partition 34 with respect to the element 18 by which the cross-sectional area of the measuring chamber 16 is defined. It will be understood that any of these parameters may be widely varied to provide for the measurement of quantities of different magnitude, but that each particular set of the mentioned parameters will define a particular quantity adapted to be measured.

Assuming that the device 12 has just been installed upon the container 10 and it is desired to dispense a measured quantity of liquid from the container 10 through the delivery passage 40 and the opening 42, the container 10 with device 12 thereon is inverted as illustrated in Fig. 4. When so inverted, liquid will flow from container 10 down through member 24 as indicated at 46 accumulating in the measuring chamber 36 as at 48 until the level of the liquid reaches the end 50 of member 24. It will be understood that in order for the liquid 46 to flow from the container 10, it is necessary that air from the measuring chamber 36 will be passing or bubbling upwardly through the member 24 in a direction counter to that of the flow of the liquid 46, which air replaces the liquid 46 within the container 10 and permits the liquid 46 to flow downwardly through the member 24. As soon as the level of the accumulated liquid 48 has closed off the end 50 of member 24, no further air can gain access into container 10, and the flow of liquid 46 through member 24 into the measuring chamber 36 abruptly halts. It will now be quite apparent how the spacing of the end 50 of member 24 from plate 28 and the transverse cross-sectional area of the measuring chamber 36 determines the amount of liquid 48, which can be accumulated within the chamber 36 before the rising level of the accumulated liquid 48 forms an air lock resulting in the immediate discontinuance of downward flow of the liquid 46.

Having thus measured a predetermined quantity of liquid 48 into the measuring chamber 36, the bottle 10 carrying device 12 thereon is next returned to its normal or upright position. Obviously, this causes the liquid 48 to flow downwardly into the storage chamber 38, whatever liquid 46 may have been in member 24 simultaneously flowing back into the container 10. The device 12 is then in a readied condition and adapted for dispensing the measured quantity of liquid 48 through the passage 40 when the container 10 and device 12 are next inverted, it being obvious that during such inversion for delivery purposes another measured quantity 48 will be formed in the measuring chamber 36 for transfer to the storage chamber 38 when the container 10 and device 12 are again returned to upright condition. It will be obvious, therefore, that a properly measured quantity ready for dispensing will always be in the storage chamber 38 after the initial inversion of the container 10 following installation of the device 12 thereon.

Those skilled in the art will appreciate that, when the transverse cross-sectional area of the measuring chamber 36 is kept relatively small, as illustrated, the virtually instantaneous cut-off of delivery of liquid 46 to the measuring chamber 36 when the air lock condition occurs will result in extreme accuracy of measurement of the quantity of liquid 48.

The opening 30 and plug 32 are provided so that, if it is desired to dispense liquid from container 10 in a continuous flow and without measurement, the plug 32 may simply be removed, whereupon the liquid 46 will flow directly and continuously from the container 10 through the member 24 and out the opening 30 when the container 10 is inverted and until it is restored to its upright condition. It may finally be observed in connection with the embodiment of Fig. 4 that the element 18 will normally be provided with a removable closure cap (not shown) which will be emplaced over the normally uppermost end of element 18 when the device 12 is not in use. It should perhaps also be pointed out that, in order for the desired counterflow of air within the member 24 to occur in positive and efficient manner, the inner diameter of the member 24 should not be made too small; for liquids having a viscosity comparable to that of water, inner diameters of the order of 3/16 inch for the member 24 have been found quite satisfactory, although somewhat smaller diameters are operable, while larger ones will tend to give some advantage in increased positiveness of operation.

It may be observed that alternate means of mounting the device 12 upon the container 10 could be employed as desired; the thread 16 being intended as exemplary only; other possibilities would obviously include the use of a cork (not shown) through which the lower extremity of the device 12 would pass and which would be adapted for fitting tightly within the open delivery mouth of the container 10. This observation will be understood to apply equally to the embodiment of the invention illustrated in Figs. 1, 2 and 3 inclusive.

Referring now more particularly to Figs. 1, 2 and 3, wherein is illustrated a preferred embodiment of the invention incorporating certain additional improved features not included in the basic form of the invention shown in Fig. 4, the numeral 110 generally designates a liquid container having a quantity of liquid 112 therein. Container 110 is provided with a neck portion 114 having external threads 116 adapted to receive the internal threads 118 of an elongated, tubular, cylindrical element 120, threads 118 being adjacent the normally lowermost end of element 120. A circular disc 122 provided with a circular hole 124 in off-center disposition therein is secured within the interior of tubular element 120 adjacent the termination of threads 118. As will be clear in the figures, the disc 122 is coextensive in diameter with the inner diameter of element 120 and, when secured within element 120 by any suitable cement or bonding process known to the plastics art, forms a normally horizontal wall closing the element 120 adjacent the normally lowermost end thereof, except for the communication possible through the hole 124.

In this embodiment of the invention the measuring and dispensing device as a whole is generally designated by the numeral 126. Device 126, besides element 120 and disc 122, preferably includes a cylindrical cap 128 provided with an annular gasket 130 and adapted to slidably fit over the normally uppermost end of element 120 when the device 126 is not in use.

Secured upon the disc 122 and preferably extending from within the hole 124 in a normally upward direction within the interior of element 120 is an elongated, tubular, cylindrical sleeve 132. An elongated, tubular, cylindrical member 134 is extended through sleeve 132 and hole 124 and is of diameter substantially complementary with the inner diameter of sleeve 132 so that member 134 is slidable within sleeve 132 but adapted for being sustained in any position of reciprocation relative to the sleeve 132 by the frictional interengagement therebetween. The member 134 is preferably provided with a number of openings 136 extending in spaced relationship from its normally lowermost end a distance which will be insufficient for any of the openings 136 to clear the normally uppermost extremity of sleeve 132 when the member 134 is in any disposition relative to the sleeve 132 to be used in the operation of the device 126. This will become more clear from the explanation of operation of the device 126 to follow.

Within element 120 and secured therein in normally overlying relationship to the sleeve 132 and member 134 is a plate 138 of circular segment shape provided with a circular perforation 140 therein in alignment with the extended axis of member 134. Depending from the plate 138, when the container 110 and device 126 are in normal upright condition, is a partition or wall 142 which extends completely across the interior of element 120 transversely thereof and extends normally downwardly from plate 138 to a point in spaced relation to disc 122 longitudinally of the element 120.

A tubular extension 144 is mounted on plate 138 in communication with perforation 140 and extends in a normally upward direction from plate 138 toward the end of element 120 remote from container 110. The extension 144 is internally threaded adjacent its normally uppermost end as at 146 for receiving either a set of external threads 148 or a set of external threads 150 of a plug 152 having an outturned flange 154 between the threaded portions 148 and 150 and a solid cylindrical portion 156 extending from the threaded portion 148. An annular gasket 158 is preferably provided within the element 120 adjacent the normally lowermost side of disc 122, gasket 158 being adapted for effecting a seal between the device 126 and the container 110 when the threads 118 are fully engaged upon the threads 116.

It will be understood that, as was the case with the embodiment of Figure 4, the various rigidly interconnected parts of the device 126 may be secured to each other by any suitable cement or other plastic bonding process, where plastic is used in forming the device 126, or may be integrally formed in various interconnected combinations. Where the device 126 is formed of metal the interconnection between parts rigidly secured together may be effected by welding, brazing, soldering or other suitable means.

The device 126 is illustrated in the condition which would obtain after initial priming with a previously measured quantity of liquid 157 disposed in the storage chamber portion 159 of element 120 between the disc 122 and the normally lowermost extremity of partition 142 and confined by the element 120. In this embodiment the measuring chamber 160 includes not only that space between the element 120 and the partition 142 and between the plate 138 and the normally lowermost end of the member 134, but also that space within the tubular extension 144 which may not be occupied. The delivery passage between element 120 and partition 142 is designated by the numeral 162.

Assuming that it is desired to deliver the measured quantity of liquid 157 from the device 126, the cap 128 is removed, and the container with device 126 thereon is inverted by tilting the same in a clockwise direction as same is illustrated in Fig. 1. The quantity of liquid 157 will thereupon flow downwardly and outwardly through passage 162 and out of the device 126. At the same time that the container 110 and device 126 are in inverted condition, however, a portion of the liquid 112 within container 110 will commence flowing downwardly through the member 134 into the measuring chamber 160, it being noted that even if only a small quantity of liquid 112 remains in the container 110, same may gain ingress to the member 134 through the apertures 136. Such flow of liquid 112 through the member 134 will, as previously explained in connection with the embodiment of Fig. 4, be accompanied by a counterflow of air from within the element 120 into the container 110 to take the place of the displaced liquid 112 flowing into the measuring chamber 160. As soon as the liquid flowing into the measuring chamber 160 has reached a level closing the end 164 of member 134, an air lock will be created, and no further liquid will flow. Thereupon, the quantity of liquid 157 previously measured will have been fully dispensed, and the container 110 and device 126 thereon may be returned to their normally upright condition, whereupon the quantity of liquid 112 just measured into the chamber 160 will flow into the storage chamber 159 for dispensing upon a subsequent inversion of the container 110 and device 126.

It will now be perceived that the adjustably slidable disposition of the member 134 within the sleeve 132 is adapted to permit wide variations in the volume of the measuring chamber 160 by which the quantity of liquid to be measured and dispensed by the device 126 can be varied throughout broad limits. Thus, a single device 126 may be adapted for dispensing a wider range of measured quantities of liquid than has heretofore been possible in any single device. The member 134 may, if desired, be provided with suitable graduations thereon or the apertures 136 can be located in predetermined manner to serve as calibrations by which a user of the device 126 may preset the member 134 to a position for measuring any desired quantity. It may be noted that, although the range of measurable quantities is wide, the inherent accuracy of the device in measuring any selected quantity is not lessened.

The cap 152 is adapted to be unscrewed from the extension 144 to provide a means of direct or continuous flow delivery of the liquid 112 from the member 134 and through the extension 144, when such mode of operation is desired. For such continuous flow dispensing, the provision of the extension 144 has been found to be advantageous in directing the flow in a suitable stream as it leaves the device 126.

For measured quantity dispensing, however, the plug 152 must be in place within the extension 144. The plug 152 is formed in novel manner with the pair of opposed threaded portions 148 and 150 either of which is alternately engageable within the threads 146 of extension 144. As will be clear from Fig. 1, when the threaded portion 148 of plug 152 is engaged within threads 146 the solid portion 156 of plug 152 occupies substantially all of the internal volume of the extension 144. Solid portion 156 is of predetermined size, however, preferably having that volume which would be occupied by some predetermined quantity of liquid, say a teaspoon thereof. Thus, with the member 134 adjusted to dimension the measuring chamber 160 for the measurement of one teaspoon when the plug 152 is in place within extension 144 with the solid portion 156 therewithin, the device will be adapted for automatically measuring and dispensing the liquid in quantities of one teaspoon. If it is desired to at times dispense such liquid in quantities of a tablespoon (or two teaspoons), the plug 152 may simply be reversed so that threaded portion 150 is engaged within the threads 146, whereupon the internal volume or space within the extension 144 which was previously occupied by the solid portion 156 of plug 152 will be open and will be added to the portion of the measuring chamber 160 disposed between plate 138 and end 164 of member 134. This feature of adjustability, although not intended to give the wide range of variation made possible by the slidable mounting of member 134 is adapted for giving a quick and convenient selection between a pair of quantities of liquid which are most commonly desired to be dispensed.

It will now be fully apparent that this invention provides combinations of structure ideally suited for achieving the objects contemplated. It will also be observed that, although certain details of construction are important, many minor modifications and changes could be made from the exact structure shown and described for purposes of illustration without departing from the true spirit or intention of the invention. Accordingly, it is to be understood that the invention shall be deemed limited only by the scope of the appended claims.

Having thus described the invention what is claimed as new and desired to be secured by Letters Patent is:

1. A device for use in dispensing a measured quantity of liquid from a container having an open delivery mouth therein, said device comprising an elongated tubular element; means adapted for mounting the element on the container with the longitudinal axis of the element normally disposed substantially vertically and the normally lowermost end of the element in sealed communication with the mouth of the container; a disc mounted within the element in transversely extending relationship to the latter adjacent said normally lowermost end thereof, said disc being provided with an opening therethrough for placing the interior of the element normally above said disc in communication with the mouth of the container; a plate mounted within the element in transversely extending relationship to the latter and normally above and in spaced relationship to said disc, said plate being provided with an aperture therethrough for placing the interior of the element normally below said plate in communication with the atmosphere; a tubular extension communicating with said aperture mounted upon the plate and extending normally upwardly therefrom; a removable plug adapted for closing the normally uppermost extremity of the extension, a partition mounted within the element in generally longitudinally extending relationship to the latter, the normally uppermost extremity of said partition being interconnected with said plate, the normally lowermost extremity of said partition being spaced from said disc, whereby said partition divides the interior of the element into a pair of normally side-by-side compartments communicating with each other adjacent said disc and separated from each other as said plate is approached; and an elongated tubular member mounted on the disc and having its normally lowermost end in communication with said opening, the normally uppermost end of said member being disposed above the normally lowermost extremity of said partition within one of said compartments, said aperture through the plate being in communication with the other of said compartments adjacent the normally uppermost extremity of the latter.

2. In the device as set forth in claim 1, wherein said plug has a pair of opposed end portions either of which are adapted to be received by said extension for closing the normally uppermost extremity of the latter, one of said end portions being of substantially greater size than the other, whereby said one end portion is adapted to occupy a substantially greater part of the interior of said extension than the other of said end portions.

3. A device for use in dispensing a measured quantity of liquid from a container having an externally threaded neck of circular transverse cross-section provided with an open delivery mouth at the normally uppermost extremity thereof, said device comprising an elongated, cylindrical, tubular element having its normally lowermost end internally threaded to receive said neck of said container, whereby said element is adapted for mounting on said container in communication with said mouth of the latter; a circularly segmental shaped, normally horizontal plate mounted within the element transversely of the latter adjacent the normally uppermost end thereof, there being a segmental shaped dispensing aperture between the element and the plate beyond the straight extremity of the latter; a rectangular, vertical partition mounted within the element longitudinally of the latter and extending normally downwardly from said plate, said partition dividing the interior of the element transversely into a pair of side-by-side, substantially semi-cylindrical compartments, both of said compartments being open at their normally lowermost extremities, the normally uppermost extremity of one compartment being closed by said plate, the normally uppermost extremity of the other compartment being in communication with the atmosphere through said aperture; a circular, normally horizontal disc mounted within the element transversely of the latter in spaced relationship below the plate and the normally lowermost extremity of the partition, there being a circular opening in the disc normally below the open extremity of said one compartment; and an elongated, cylindrical, tubular member mounted on the disc with its normally lowermost end in communication with said opening, the normally uppermost end of the member being within said one compartment and above the normally lowermost extremity of the partition.

4. In the invention as set forth in claim 3, wherein said member is adapted to extend through said opening and is mounted on said disc for longitudinal shifting movement by means of a cylindrical sleeve rigidly secured to the disc and slidably receiving said member in frictional engagement therewithin.

5. In the invention as set forth in claim 4, wherein said member is provided with a number of perforations spaced along a length thereof adjacent its normally lowermost end.

References Cited in the file of this patent

UNITED STATES PATENTS

| 1,009,550 | Moys et al. | Nov. 21, 1911 |
| 1,123,974 | Antoine et al. | Jan. 5, 1915 |
| 2,091,929 | Kappenberg | Aug. 31, 1937 |
| 2,243,452 | Bickel et al. | May 27, 1941 |